United States Patent
Turman et al.

(10) Patent No.: US 8,079,174 B1
(45) Date of Patent: Dec. 20, 2011

(54) ANIMAL LEG SNARE DEVICE

(75) Inventors: John W. Turman, El Cajon, CA (US);
Joseph P. Albee, Jr., Julian, CA (US);
Terrance A. Cox, Descanso, CA (US);
Donald R. Simms, Mariposa, CA (US);
Ronald I. Anderson, Sonora, CA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 608 days.

(21) Appl. No.: 12/235,692

(22) Filed: Sep. 23, 2008

Related U.S. Application Data (60) Provisional application No. 60/995,497, filed on Sep. 27, 2007.

(51) Int. Cl.
*A01M 23/34* (2006.01)
(52) U.S. Cl. .................................. 43/87; 43/85
(58) Field of Classification Search ............... 43/58, 80, 43/81, 81.5, 85–87
See application file for complete search history.

(56) References Cited

U.S. PATENT DOCUMENTS

| | | | | |
|---|---|---|---|---|
| 2,178,256 A | * | 10/1939 | Graybill | 43/87 |
| 2,592,390 A | * | 4/1952 | Burt | 43/87 |
| 4,329,805 A | * | 5/1982 | Novak | 43/87 |
| 4,581,843 A | * | 4/1986 | Fremont et al. | 43/87 |
| 4,581,844 A | * | 4/1986 | Torkko | 43/87 |
| 4,751,790 A | * | 6/1988 | Thomas | 43/87 |
| 5,956,891 A | * | 9/1999 | Lee | 43/87 |
| 6,032,405 A | * | 3/2000 | Rose | 43/87 |
| 6,751,901 B2 | * | 6/2004 | Emond | 43/87 |

FOREIGN PATENT DOCUMENTS

GB 2063042 A * 6/1981

* cited by examiner

*Primary Examiner* — Kimberly Smith
(74) *Attorney, Agent, or Firm* — John Fado; Randall E. Deck; Lesley Shaw (57) ABSTRACT

A leg snare apparatus and method for capturing animals uses a mechanical throw arm, that when triggered by an animal of sufficient size stepping on the pan, throws a snare up and around the leg of the animal. The pan tension of the device may be readily adjusted to avoid being triggered by lighter weight non-target animals, and the pan may also be leveled. Moreover, the snare is supported so that it cannot be readily dislodged after the apparatus is set, the loop is not deflected out of its proper position when the apparatus is triggered, and the loop is retained in place until the throw arm has moved it high up the animal's leg or foot. Should the apparatus be triggered by larger, non-target animals, the apparatus includes a break-away snare to allow the animal to escape.

27 Claims, 12 Drawing Sheets

ANIMAL LEG SNARE DEVICE

CROSS-REFERENCE TO RELATED APPLICATION

This application claims the benefit under 35 U.S.C. 1.19(e) of U.S. provisional No. 60/995,497, filed Sep. 27, 2007, the contents of which are incorporated by reference herein.

BACKGROUND OF THE INVENTION

1. Field of the Invention

The invention is drawn to an apparatus and method for capturing the leg or foot of an animal in a snare.

2. Description of the Prior Art

A variety of traps have been developed for the capture of wild animals, including jaw traps, spring traps, and snares. However, because many traditional and proven methods to capture wild canids have been banned in many states, effective alternative methods have been quite limited. In addition, pest management in the private sector appears to be growing, with many pest control operators expanding into the management of wild animals, including canids such as coyotes. Many of the laws surrounding the trapping of animals have impacted the private sector severely, particularly pest control operators and commercial trappers. Thus, the need remains for wildlife control techniques that are both effective and humane, and in compliance with federal, state, and local laws.

SUMMARY OF THE INVENTION

We have now developed an apparatus and method for capturing animals so that they may be safely managed and controlled. The apparatus includes a. a frame;
b. a trigger pivotally attached to the frame adjacent one end thereof which includes a pan movable between a cocked position and a release position when pivoted down in response to pressure applied from a target animal;
c. an optional, but preferred, bail pivotally attached to the frame which is movable between a position substantially parallel to the frame and a position wherein it is pivoted up, which bail is disposed partially around the pan and is effective for retaining a portion of a loop of a snare thereunderneath when the pan is in its cocked position and the bail is substantially parallel to the frame;
d. a throw arm pivotally attached to the frame and movable between a first position substantially parallel to the frame and a second position wherein it is pivoted up;
e. a resiliently coiled spring having one end applying pressure against the frame and the other end applying pressure against the throw arm so as to force the throw arm to swing up in a direction away from the frame;
f. a catch between the pan and the throw arm for releasably retaining the throw arm positioned substantially parallel to the frame when the pan is in its cocked position, and releasing the throw arm to swing up when the pan is pivoted down to its release position; and
g. an open ended horseshoe member attached to the throw arm which includes a pair of outwardly extending opposed side arms and, when a bail is present, opposed first and second flanges projecting inwardly from the side arms, wherein the opposed side arms at least partially circumscribe the bail and the opposed first and second flanges extend inwardly below the bail when the bail and throw arm are both positioned substantially parallel to the frame.

In use, the apparatus is set to trap an animal by placing the throw arm and bail substantially parallel to the frame with the first and second flanges of the horseshoe below the bail, placing the pan in its cocked position with the catch engaged to retain the throw arm, and providing a snare with a loop disposed around the pan. A target animal is caught in the snare when the animal steps on the pan, thereby disengaging the catch pan and releasing the throw arm to swing up under the force of the resilient spring and pull the loop of the snare tight against the animal's foot or leg.

In accordance with this discovery, it is an object of this invention to provide an effective, selective and humane method and apparatus for capturing animals, particularly wild animals such as the coyote.

It is another object of this invention to provide a method and apparatus for capturing animals which may be readily adjusted so as to not be triggered by lighter weight non-target animals.

A further object of this invention is to provide a method and apparatus for capturing animals wherein the trigger pan may be readily and precisely leveled.

Still another object of this invention is to provide a method and apparatus for capturing animals wherein the snare is supported so that it cannot be readily dislodged after the apparatus is set, the loop is not deflected out of its proper position when the apparatus is triggered, and the loop is retained in place until the throw arm has moved it high up the animal's leg or foot.

Yet another object of this invention is to provide a method and apparatus for capturing animals with a break-away snare to allow larger, non-target animals to escape.

These and other objects and advantages of the invention will become readily apparent from the ensuing description.

| Reference Characters | |
|---|---|
| 10 | frame |
| 11 | frame body |
| 12 | first end of frame |
| 13 | second end of frame |

-continued

| Reference Characters | |
|---|---|
| 15 | dowel |
| 20 | pan |
| 21 | flange |
| 22 | hinge |
| 30 | bail |
| 31 | closed, projecting end of bail |
| 32 | end of bail |
| 33 | end of bail |
| 34 | hinge |
| 40 | snare |
| 41 | loop |
| 42 | first end of snare |
| 43 | second end of snare |
| 44 | clamp |
| 45 | cam-lock |
| 46 | shear pin |
| 47 | swivel attachment to anchor |
| 48 | S-hook |
| 50 | throw arm |
| 51 | shaft |
| 52 | first end of throw arm |
| 53 | second end of throw arm |
| 54 | hinge |
| 60 | horseshoe member |
| 61 | side arm |
| 62 | side arm |
| 63 | horseshoe opening |
| 64 | first flange |
| 65 | second flange |
| 66 | clip |
| 67 | cinch bar |
| 70 | resilient coil spring |
| 71 | first end of spring |
| 72 | second end of spring |
| 73 | axle |
| 74 | sleeve |
| 80 | catch |
| 81 | dog or flange |
| 82 | detent |
| 83 | screw |
| 84 | nut and bolt |
| 85 | slot |
| 90 | set screw |
| 91 | hook |

DETAILED DESCRIPTION OF THE INVENTION

The apparatus of this invention is effective for securely and humanely capturing target animals with a minimal level of trauma, and also provides selectivity to exclude from capture lighter weight non-target animals while allowing larger non-target animals to break free. Although the invention may be used to capture a number of animals, including domestic animals, it is particularly valuable for capturing wild animals, most particularly carnivores and other animals harmful to livestock, humans, and property. Without being limited thereto, animals which may be captured include canids, particularly coyotes (*Canis latrans*), domestic or wild dogs (*C. familiaris*), and wolves (*C. lupus*), fox (*Vulpini*), members of the cat family felidae, such as bobcats (*Lynx rufus*) and mountain lions (*Felis concolor*), feral pigs (*Sus scrofa*), and bears (family Ursidae).

Referring to the figures, the apparatus includes a frame or base (10) having a body (11) with first and second ends (12) and (13), respectively. The frame is preferably flat or planar to facilitate placement on or in the ground (e.g., buried below the surface). A trigger is pivotally attached to the frame adjacent (i.e., near) the first end (12) thereof and extending away therefrom. The trigger includes a pan or plate (20) which is movable between a cocked (i.e., set) position shown in FIGS. 1 and 3, 4B, and 5 wherein the pan is substantially parallel to the frame (i.e., substantially horizontal when the frame is flat on the ground), and a release position shown in FIGS. 2, 4A, and 6 wherein the pan is pivoted down in response to pressure applied from a target animal, illustrated in FIGS. 5 and 6 by dowel 15. Although the pan may be constructed in a variety of shapes, it is preferably substantially flat to increase the potential contact area with the target animals foot. The pan also preferably includes a flange (21) extending from its rearward edge which includes a hinge (22) for attachment to the frame (10).

Figure 1:
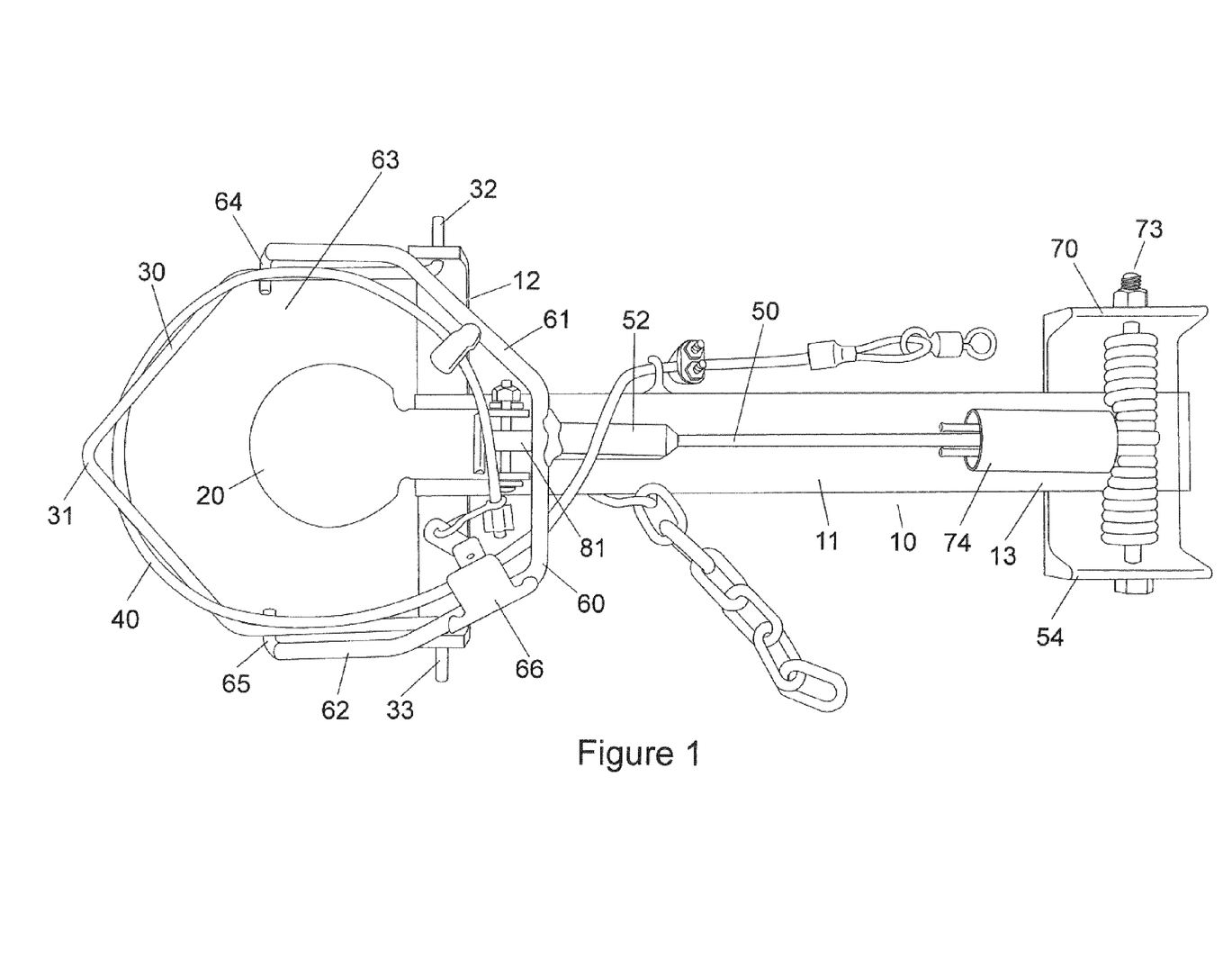
FIG. 1 shows a top view of a first embodiment of the apparatus in the set position.
Figure 2:
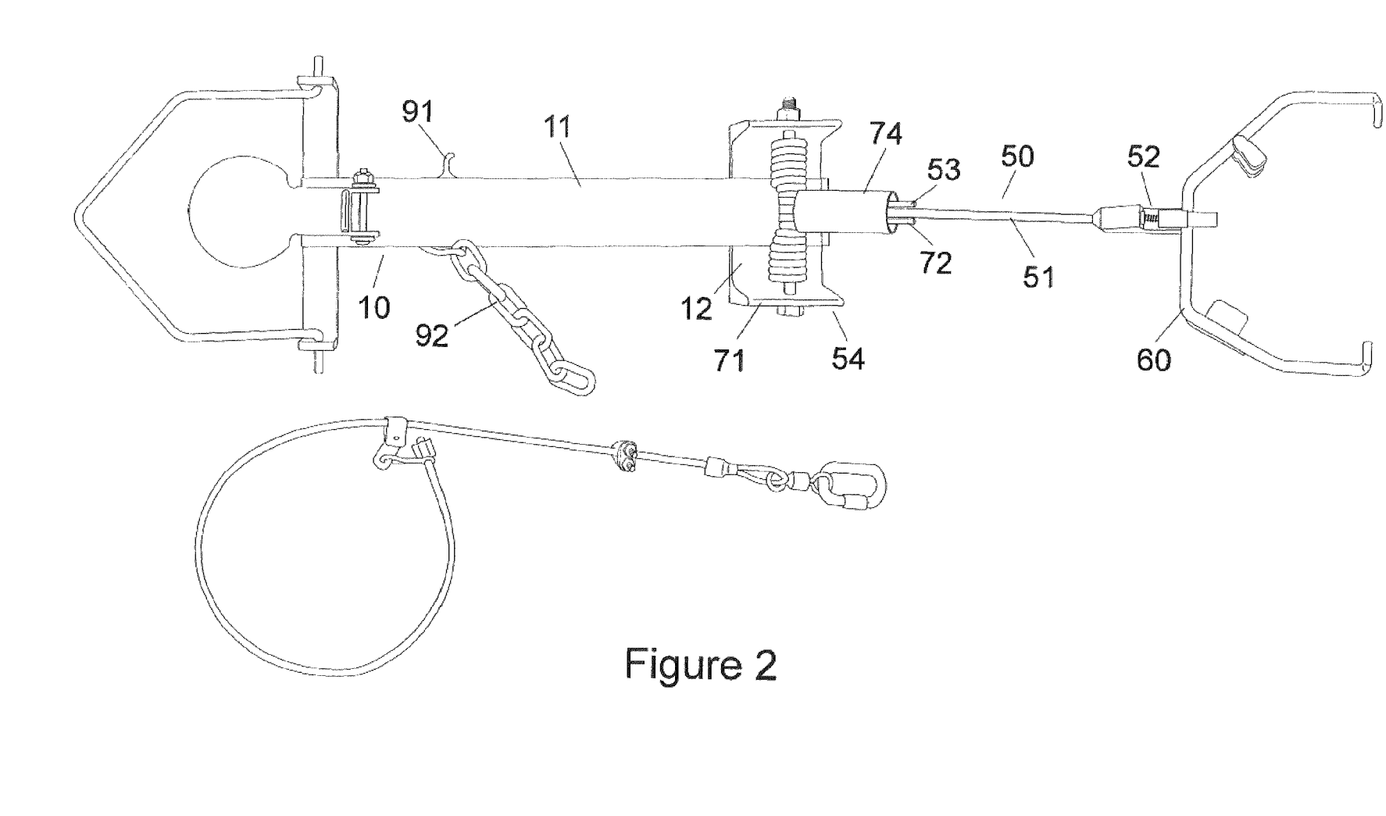
FIG. 2 shows a top view of the first embodiment the apparatus in the released position.
Figure 7:
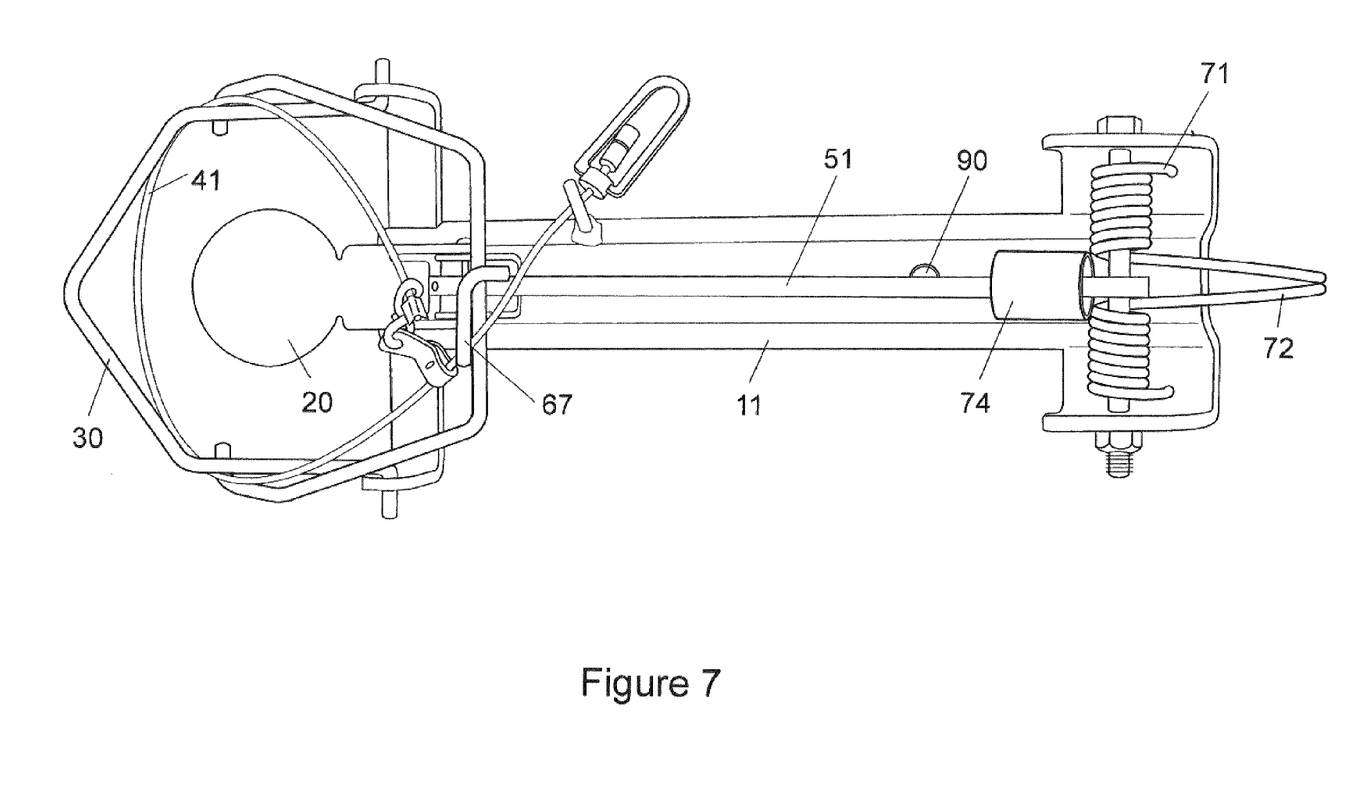
FIG. 7 shows a top view of a second embodiment of the apparatus in the set position.
Figure 8:
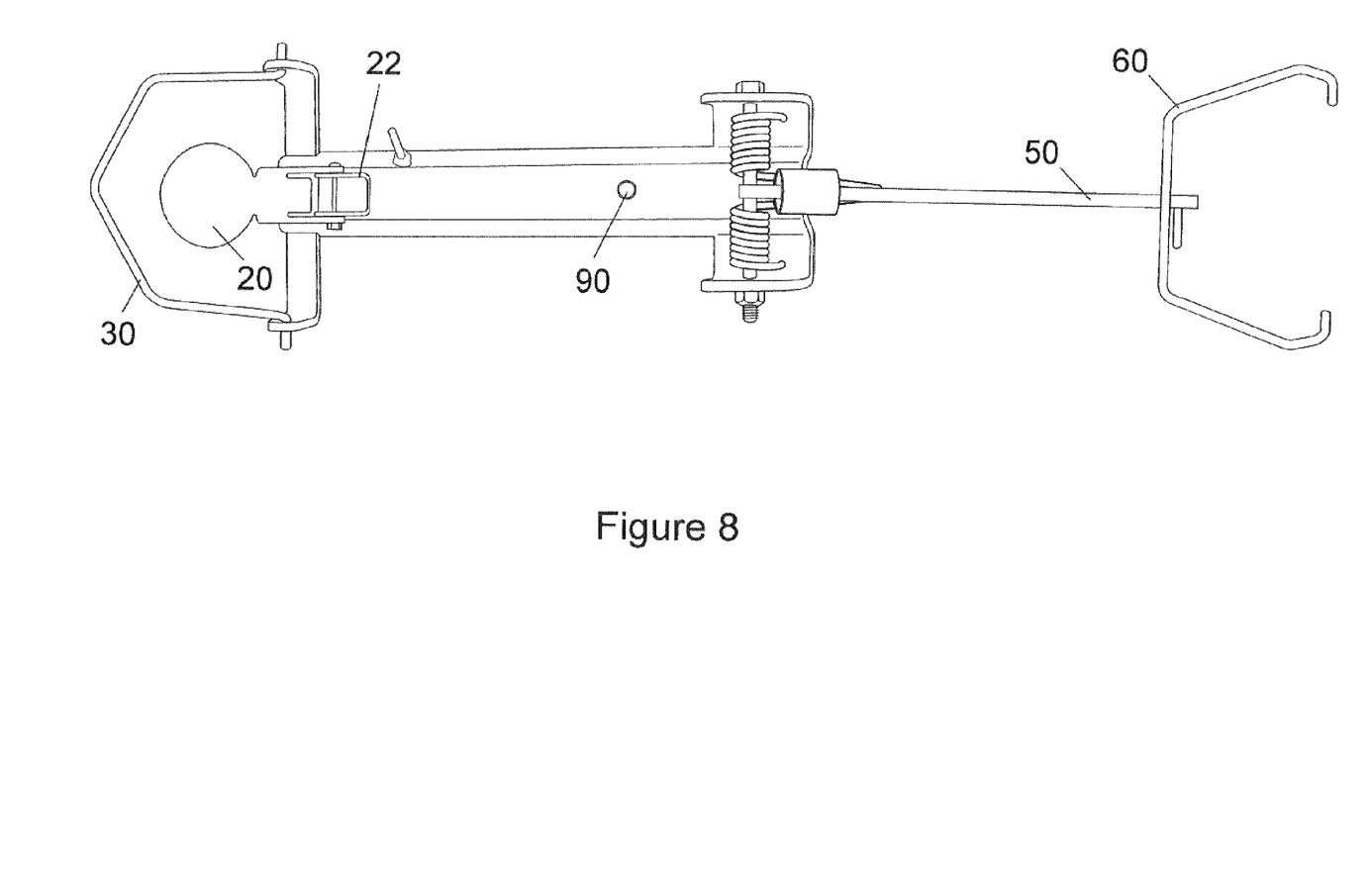
FIG. 8 shows a top view of the second embodiment of the apparatus in the released position.

An optional bail (30) is preferably provided, pivotally attached to and extending away from the frame (10) adjacent (i.e., near) its first end (12) to support the loop of a snare (40) and facilitate its placement and retention in a proper position as will be described hereinbelow. The bail has a closed, freely projecting end (31), and is attached at ends (32) and (33) to the frame at hinge (34), allowing it to be freely movable between a position substantially parallel to the frame (10) and substantially horizontal when the frame is flat on the ground, to a position wherein the bail is pivoted up. When the pan (20) is set in its cocked position the bail (30) is disposed partially around the pan (20) and the snare (40) is positioned with a portion of its slidable loop (41) underneath the bail's projecting end (31) as shown in FIGS. 1 and 7. Positioning the loop of the snare under the bail in this manner helps to ensure that the loop is not initially deflected out of its proper position when the apparatus is triggered such as when the snare is propelled from under the ground, and to support the snare so that it cannot be readily dislodged once the trap is set, as may occur with conventional snares when animals dig around the trap. The bail may be configured in a variety of shapes, including but not limited to, a regular or irregular loop, semicircle or polygon. However, in a preferred embodiment, the projecting end (31) of the bail includes a substantially triangular projection which is most effective for retaining the loop (41) of the snare when the device is in the cocked position.

Movement of the snare (40) upward about the leg or high on the foot of the target animal is effected by throw arm (50). This throw arm includes a shaft (51) with first and second ends, (52) and (53), respectively, with the second end being pivotally attached to said frame (10) at hinge (54) adjacent or near to said second end (13) thereof. This allows the throw arm to be movable between a first position substantially parallel to the frame (10) and substantially horizontal when the frame is flat on the ground, to a position wherein the arm is pivoted up when the trap has been triggered by a target animal.

Figure 9:
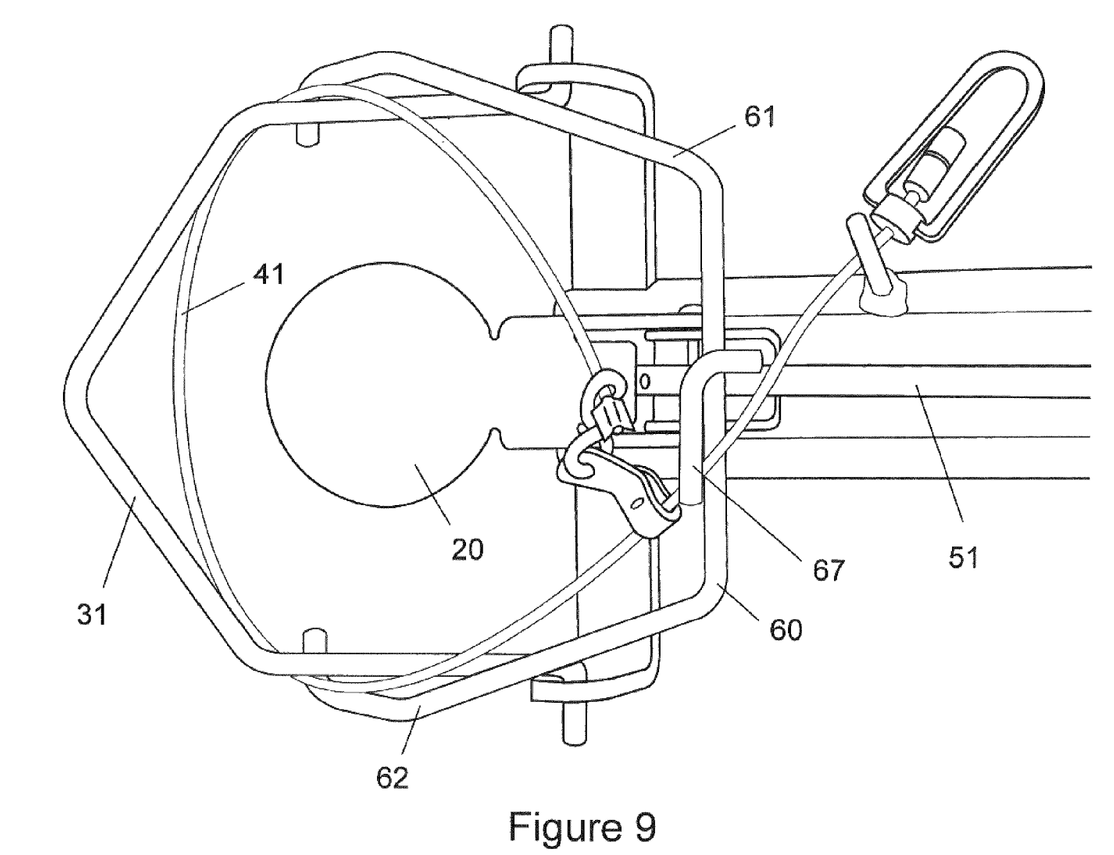
FIG. 9 shows a close-up view of the trigger, bail, catch and horseshoe of the second embodiment of the apparatus.

To further retain the snare (40) in it's proper orientation, the throw arm (50) includes an open ended horseshoe member (60) attached adjacent to and extending from its first end (52). The horseshoe member (60) includes a pair of opposed side arms (61) and (62) extending outwardly away from the throw arm, with an opening (63) therebetween to allow the horseshoe and throw arm to swing past the leg of the target animal when the trap is triggered. If the preferred bail (30) is used, the opposed side arms (61) and (62) at least partially circumscribe the bail (30) at their outer ends. In addition, the horseshoe will preferably include opposed first and second flanges (64) and (65) projecting inwardly from the side arms (61) and (62), respectively, which extend inwardly below the bail when the bail and throw arm are both positioned substantially parallel to the frame (10). These first and second flanges function to contact the bail (30) and pivot it upwardly when the throw arm is pivoted up after the device has been triggered. Moreover, when the loop (41) of the snare is positioned above or on top of the flanges as shown in FIG. 1, 7 or 9, the flanges also function to maintain the snare loop encircling the pan (20) and prevent it from sliding onto hinge (34). The shape of the horseshoe member is not critical, and it may be a regular or irregular semi-circle, U- or C-shaped, or an open, regular or irregular polygon.

Figure 3:
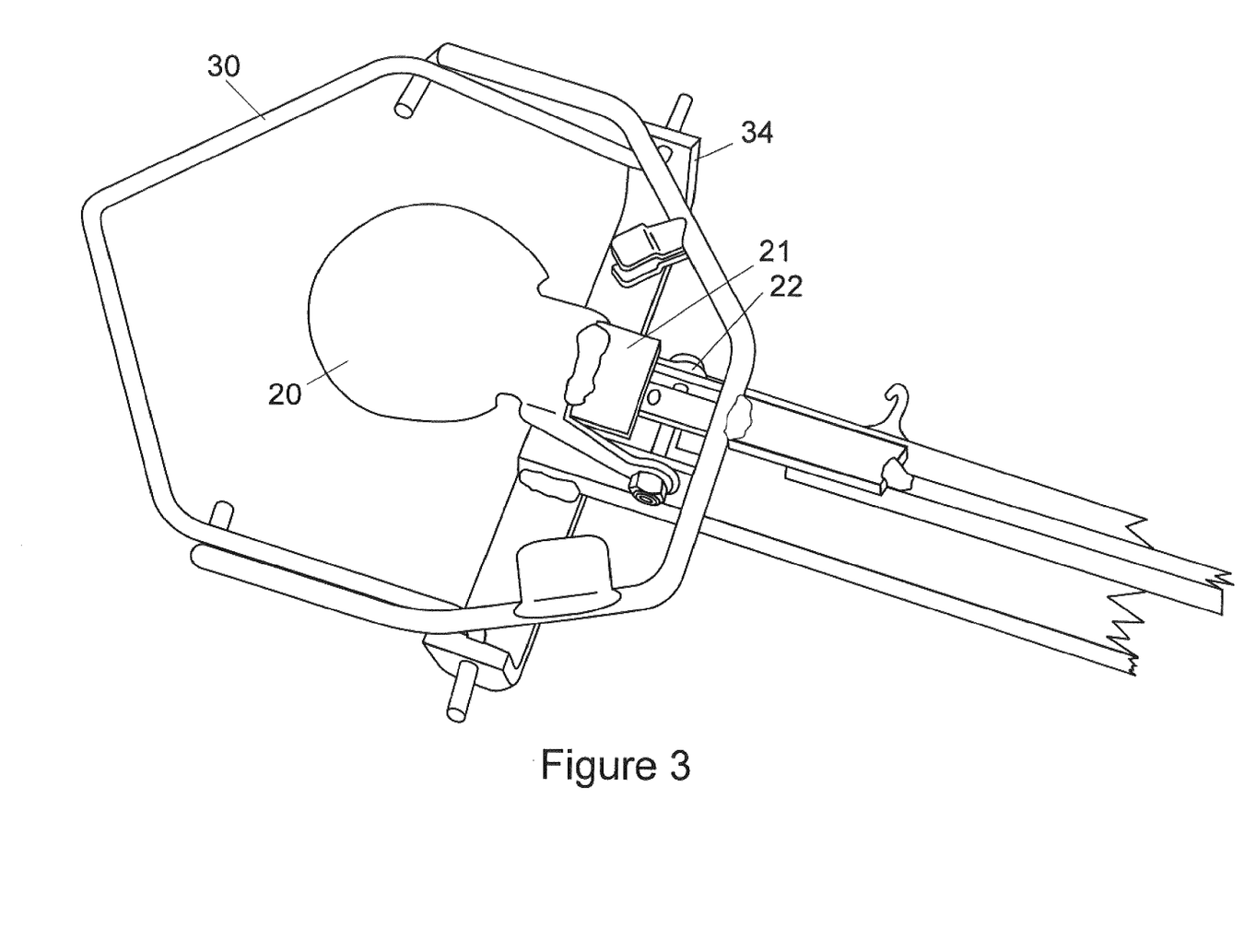
FIG. 3 shows a close-up view of the trigger, bail, catch and horseshoe of the first embodiment of the apparatus.
Figure 6:
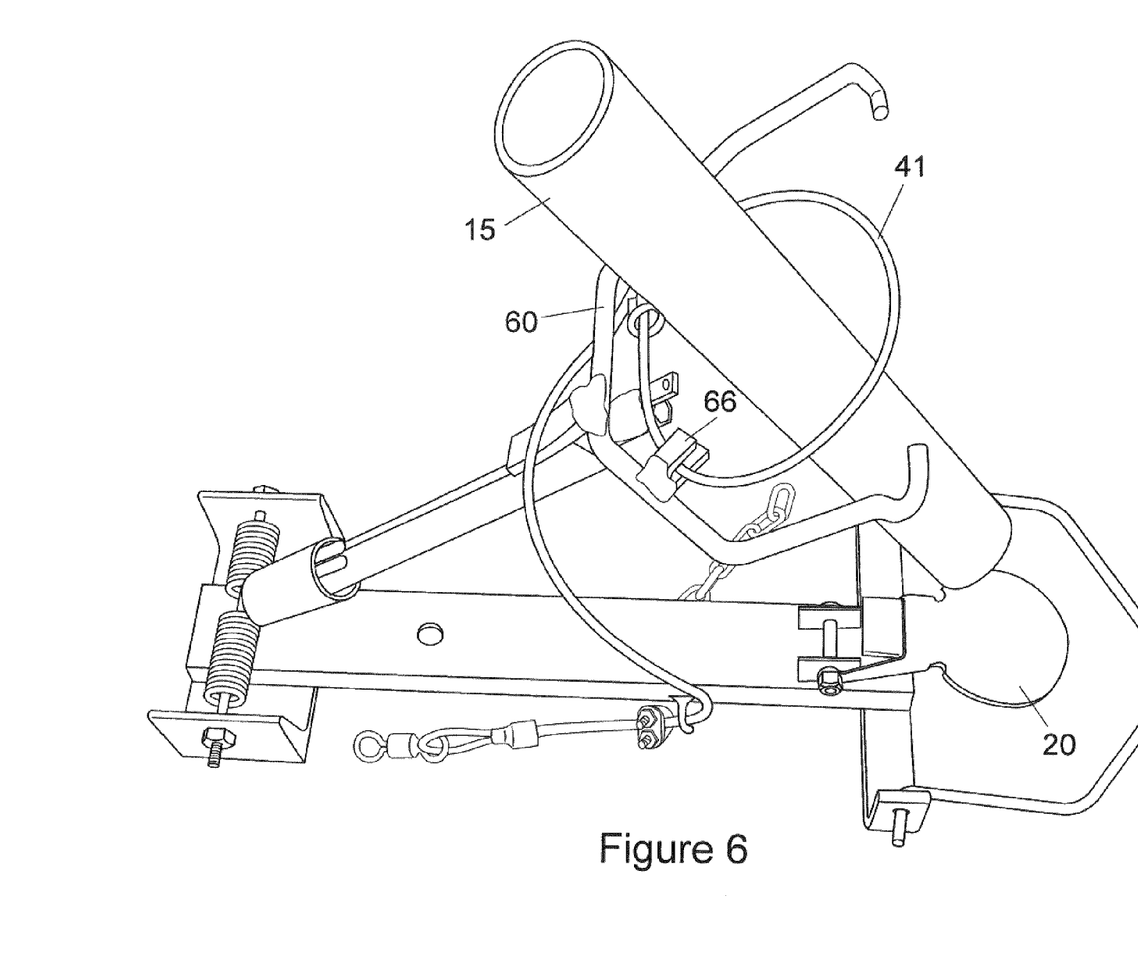
FIG. 6 shows a perspective view of the first embodiment of the apparatus as it is being released.

In a preferred, yet optional embodiment, the horseshoe member (60) also includes one or more clips (66) which are effective for supporting the loop (41) of the snare (40), releasably retaining the snare and facilitating its placement and retention in a proper position. Although the bail (30) and clips (66) may be used to the exclusion of the other, in a particularly preferred embodiment they are used in combination. As shown in FIGS. 1, 3, and 6, the clips are disposed on at least one, but preferably both of the opposed side arms (61) and (62). The clips are preferably U-shaped, although it is envisioned that other configurations such as C- or open-polygon shapes may be used, and optionally include an indentation or small detent in their inner surface to retain the snare loop (41) therein until a sufficient force is applied to pull it out (such as when the trap is triggered by a target animal). The clips (66) are preferably positioned with their openings facing generally inwardly such that the loop of the snare is positioned within the horseshoe member. As shown most clearly in FIG. 1, when using such clips in combination, the horseshoe (60) may be asymmetric to more readily accommodate the placement of steel cable snares therein which are more difficult to bend. If the clips are not present, the throw arm or horseshoe are preferably provided with a cinch bar (67) (FIGS. 7 and 9), an approximately horizontal bar positioned near the junction of the horseshoe and throw arm and extending in a direction generally perpendicular to the throw arm with its outer end, open to allow the snare (40) to be slid between it and one of the arms (61) or (62) of the horseshoe member. This cinch bar facilitates the retention of the snare on the horseshoe when the trap has been set, and also acts to as a stop to enable the cam-lock (45) to cinch the cable of the snare tight against the animal's leg.

Force to swing the throw arm (50) when the trap is triggered by an animal is provided by one or more resilient coil springs (70) effective to force the first end (52) of the throw arm to rapidly swing or pivot up, away from the frame. The spring includes first and second ends, (71) and (72), with the first end in contact with frame (10) and the second end in contact with the second end of the throw arm (50). Contact with the throw arm and frame may be direct or indirect, and the spring ends may be simply pressed against them or attached thereto. It is also understood that the throw arm and second end (72) of the coil may be of unitary construction, although they are preferably constructed from separate, distinct components as shown. In a preferred embodiment, the coil spring is disposed about an axle (73) which is substantially normal to the throw arm (50) and extends through its second end (53), and which is attached to the frame (10). The second end (72) of the spring extends outwardly adjacent to the second end (53) of the throw arm. The two ends may be releasably attached by use of a sleeve (74) slidably mounted on the throw arm which is sufficiently large to be slid over the extended end (72) of the spring.

To retain the throw arm (50) substantially parallel to the frame when the pan (20) is in its cocked position, the apparatus includes a releasable catch (80) extending between and in contact with each of the pan and the throw arm [including any of the throw arm shaft (51), first end (52), or horseshoe (60)]. A variety of catches have been previously described and are suitable for use herein, and need only to engage and retain the pan and throw arm when the pan is cocked, and release the throw arm from engagement once the pan is pivoted downwardly by a target animal, allowing the throw arm to swing upward. Thus, without being limited thereto, the catch may be constructed as a hook, tooth or pawl or a dog or flange having frictionally engaged cooperating detent, and may be directly or indirectly fixed to either of the pan or throw arm. Of course, the catch should be of sufficient length to extend between the pan and throw arm. In a first preferred embodiment shown in FIGS. 3, 4, and 6, the catch includes a dog (81) which is constructed as a second flange attached to and extending from the first end (52) of the throw arm (50), and having a raised detent (82) on its upper surface which engages the back edge of the pan flange (21). The catch is engaged by positioning the throw arm parallel to the frame and raising the pan to a horizontal position until the back edge of flange (21) snaps into place against the edge of the detent (82).

Figure 4A:
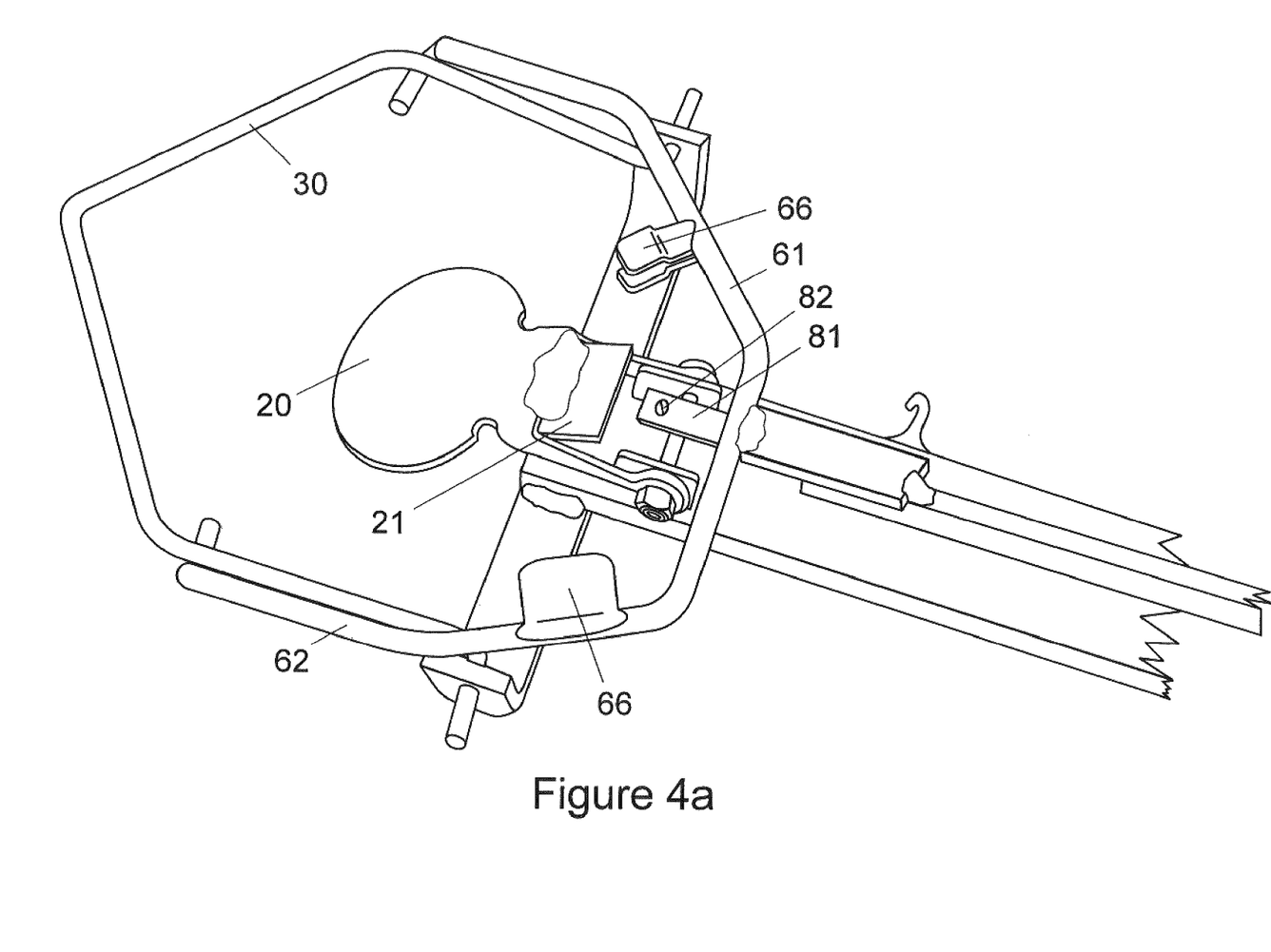
FIGS. 4A and 4B show close-up perspective and side views of the trigger and catch of the first embodiment of the apparatus.
Figure 4B:
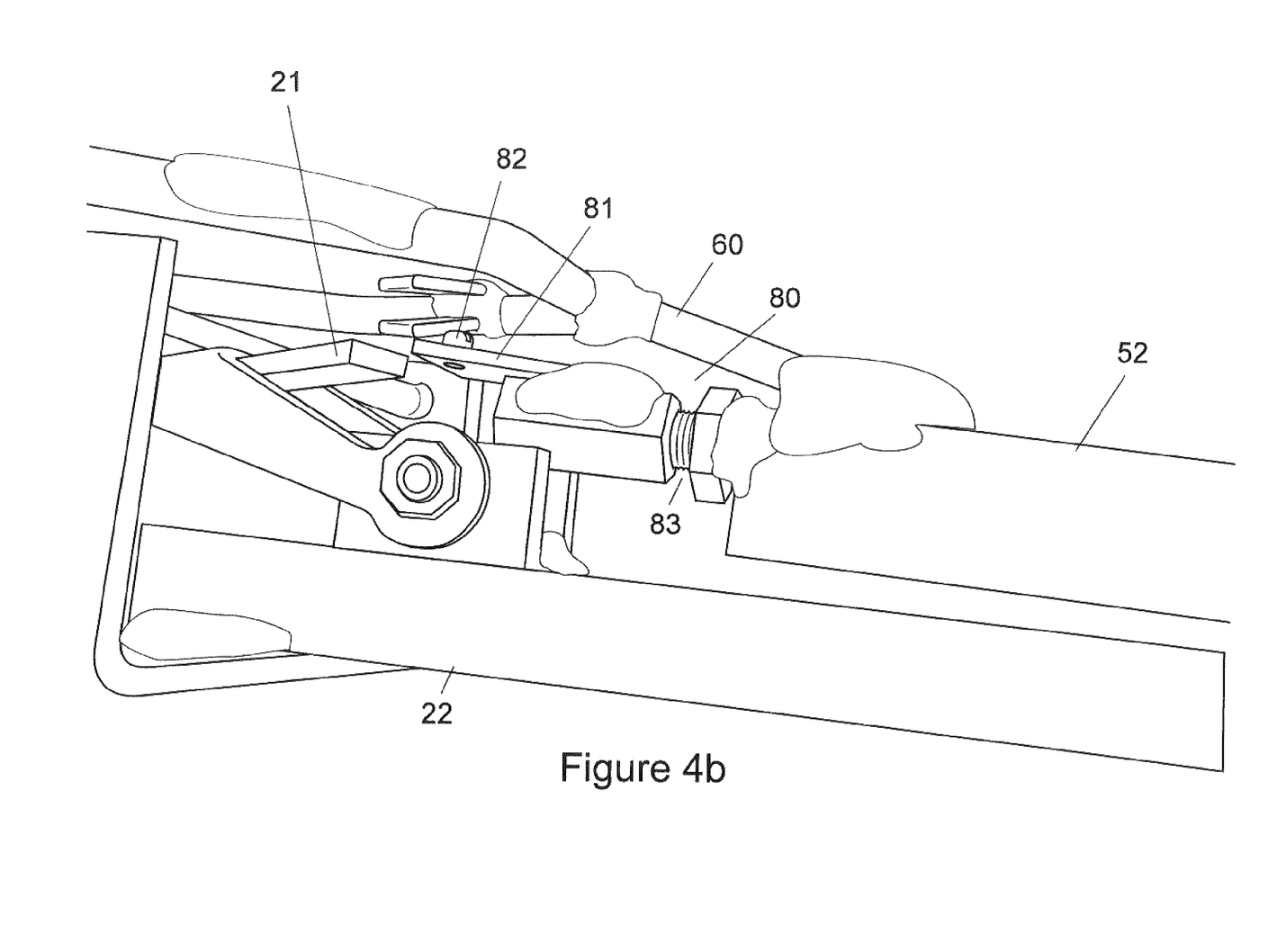
Figure 5:
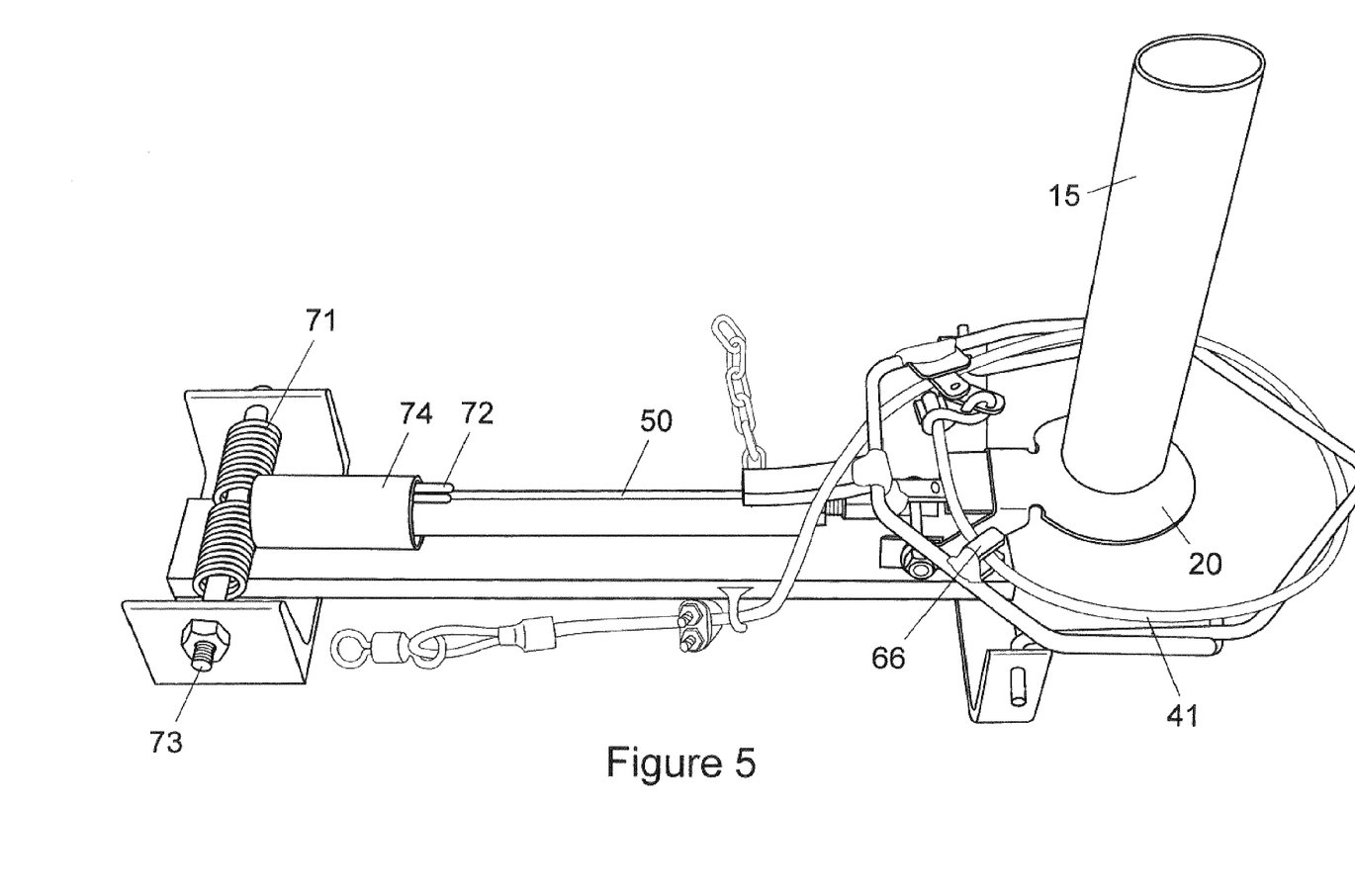
FIG. 5 shows a perspective view of the first embodiment of the apparatus in the set position prior to being triggered.

In accordance with a second preferred embodiment, the catch (80) is adjustable to allow the relative distance between it and the pan (20) or throw arm (50) which it releasably engages to be selectively adjusted. Use of an adjustable catch allows the user to level the pan, as well as providing a fine adjustment of the pan trigger tension (i.e., the force or weight applied to the pan necessary to disengage the catch and release the throw arm). For instance, as shown in FIGS. 4*a* and 4*b*, the catch includes a dog (81) attached to the first end (52) of the throw arm via a finely threaded machine screw (83). Thus the dog (81) and detent (82) may be moved toward or away from the pan by turning screw (83).

Figure 10:
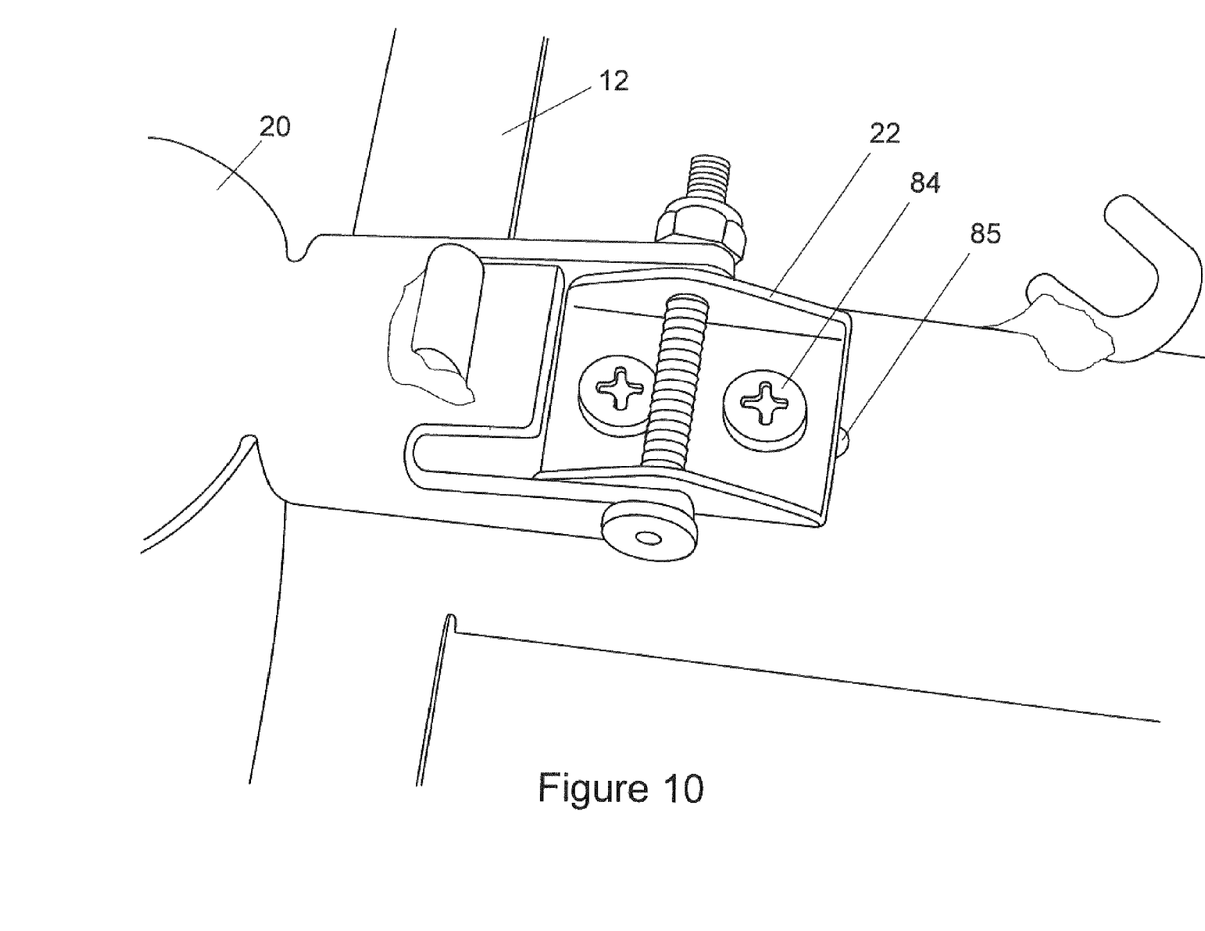
FIG. 10 shows a close-up perspective view of the trigger of the second embodiment of the apparatus.

In the alternative to constructing a catch (80) which is adjustable, it is also understood that the position of the pan or throw arm themselves may be adjustable, and provide the same benefits of pan leveling and pan tension adjustment. For example, the hinges (22) or (54) may be attached to the frame (10) by a nut and bolt (84) which is passed through a hole in one of the hinge and frame and an adjacent longitudinal slot in the other. FIG. 10 shows one such arrangement with hinge (22) being adjustably attached to the frame (10) to allow the position of the pan to be changed. The presence of the slot (85) through the frame allows the position of the hinge (22) along the length of the frame to be readily varied by loosening the bolt and moving the hinge the desired location. In accordance with another alternative, the length of the throw arm may be adjustable, such as by incorporating threads on the shaft (51).

Although pan tension may be adjusted somewhat using an adjustable catch, in a preferred embodiment pan tension is primarily adjusted by use of an adjustable set screw (90) extending upwardly from the frame body (11) in contact with the lower surface of the throw arm (50), preferably against its shaft (51) at a point relatively closer to its second end (53) than its first end (52). The set screw is vertically movable in a direction away from and toward the lower surface of said throw arm. Screwing the set screw against the throw arm increases the pan tension, that is, increases the weight or force that must be applied to the pan to release the catch and trigger the trap, while reducing the force of the set screw against the throw arm will decrease the pan tension. To removably retain the second or distal end (43) of the snare or an intermediate cable clamp (44) on the frame (10), a downwardly open hook (91) is provided into which the snare is placed and can slide. The material of construction of the various components of the apparatus is not critical, although the apparatus is typically constructed from steel or other metal for strength and durability.

Figure 11:
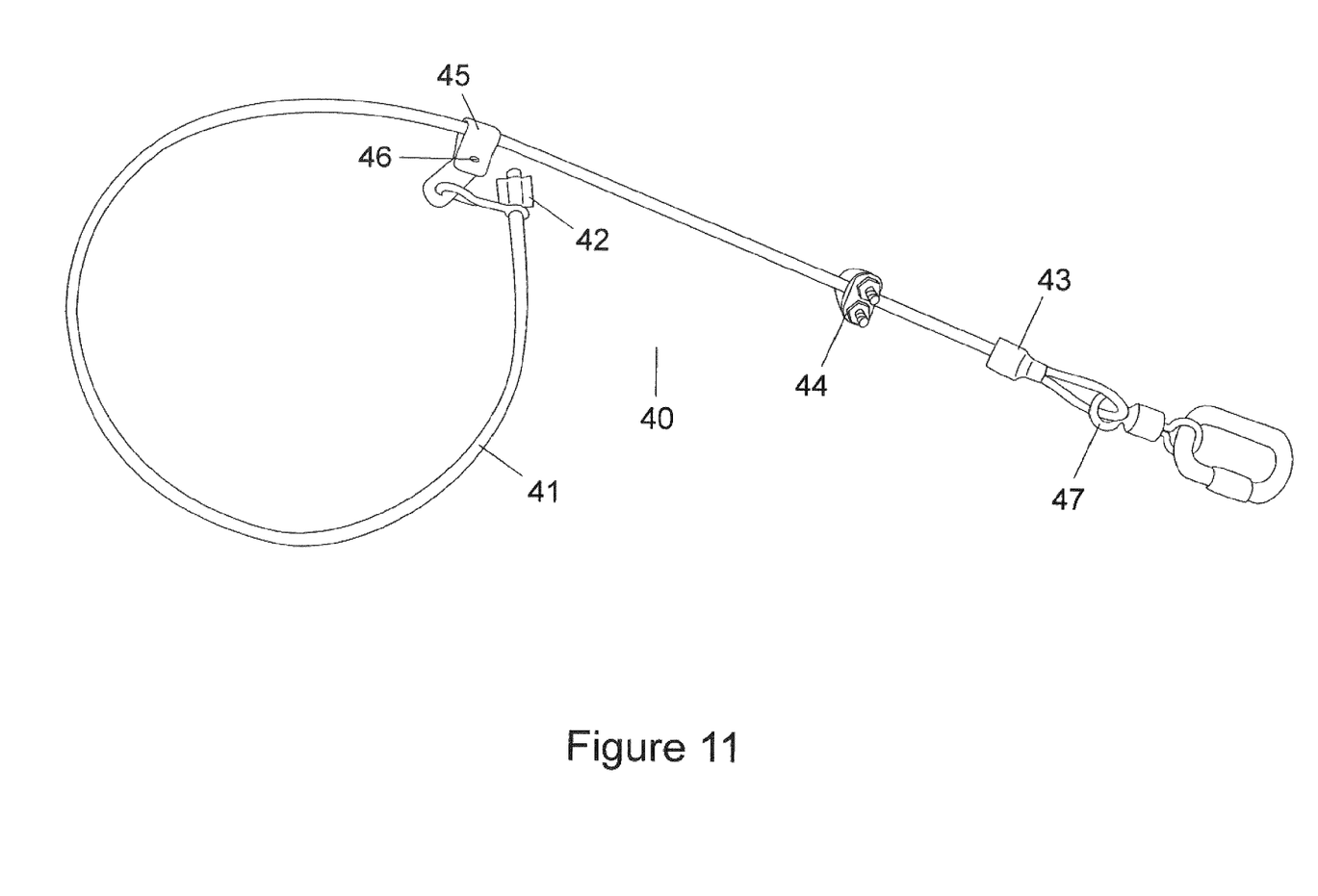
FIG. 11 shows a preferred snare for use with the apparatus.

A variety of snares are suitable for use herein, including snares conventional in the art made from flexible materials such as metal cables, plastics, synthetic or natural fabrics such as nylon or cotton, rubber, or leather. However, use of metal cable snares is preferred to prevent the target animal from chewing through the snare. A particularly preferred snare is shown in FIG. 11. As shown therein, the slidable loop (41) of the snare is formed by connecting the first end (42) to the intermediate segment of the snare with a cam-lock (45) which is slidably threaded over the snare cable. Use of a cam-lock, although optional, is preferred to prevent the loop from loosening once placed about the leg of the target animal. In a particularly preferred embodiment, the first end (42) and the cam-lock (45) are connected by an S-hook (48). This S-hook not only serves to connect the first end (42) and cam-lock (45), but it also helps to relax the cable loop (41), enabling it to lay in proper position. In another particularly preferred embodiment, the cam-lock (45) preferably includes a cam and a U-shaped channel (within which the cable is threaded) which are held in place by a break-away shear pin (46). The use of a shear pin in this manner allows the apparatus to securely trap and hold target animals while allowing larger, non-target animals to break free from the snare and escape. The strength of the shear pin may be readily selected dependent upon the size of the target animals. By way of example and without being limited thereto, a 250 pound shear pin (i.e., breaking under 250 pounds of force) is generally preferred for trapping coyotes. When in proper position with the cable in place, the cam-lock applies one-way directional pressure to the cable, thereby keeping it from loosening. The snare may be affixed to the ground by a conventional stake through a swivel attachment (47). Other, alternative, albeit less-preferred, break-away mechanisms which may also be used include, but are not limited to, a weakened section along S-hook (48).

In use, the apparatus is preferably buried in the ground in the locus or vicinity of a target animal of interest. Typically, the snare cable is anchored to the ground using the swivel attachment (47), while the frame (10) itself is not fixed to the ground. The apparatus is set by placing the throw arm (50) and bail (30) substantially parallel to the frame (10) (substantially horizontal when the frame is horizontal) with the first and second flanges (64) and (65) of the horseshoe 60 below the bail, and by raising the pan (20) to substantially horizontal position until it is in its cocked position engaged by the catch (80). After setting, the snare (40) is disposed with its loop (41) encircling or around the pan (20) and partially under the closed projecting end (31) of bail (30), and is inserted into the clips (66) on the horseshoe (if present). The snare also extends under the horseshoe and over throw arm (or its shaft (51)), under the cinch bar (67) (if present), and is affixed to the ground with anchor (47). Loose soil or brush is typically placed over the apparatus for concealment.

The apparatus is activated to catch a target animal when the animal steps on the pan (20), thereby pivoting the pan down, disengaging the catch (80), and swinging the throw arm up (50) under the force of the resilient spring (70). The upward swing of the throw arm moves the snare high up on the foot or leg of the animal and pulls the loop (41) tight against the foot or lee, where it is retained by cam-lock (45).

It is understood that the foregoing detailed description is given merely by way of illustration and that modifications and variations may be made therein without departing from the spirit and scope of the invention.

We claim:

1. An apparatus for capturing animals in a snare comprising:
   a. a frame having first and second ends adapted to be placed on or in the ground;
   b. a trigger pivotally attached to said frame adjacent said first end thereof, said trigger comprising a pan movable between a cocked position substantially parallel to said frame, and a release position wherein said pan is pivoted down in response to pressure applied from a target animal;
   c. a bail pivotally attached to said frame adjacent said first end thereof and movable between a position substantially parallel to said frame, and a position wherein said bail is pivoted up, said bail being disposed partially around said pan and is effective for retaining a portion of a loop of a snare thereunderneath when said pan is in said cocked position and said bail is substantially parallel to said frame;
   d. a throw arm comprising first and second ends, said second end of said throw arm being pivotally attached to said frame and movable between a first position substantially parallel to said frame, and a second position wherein said arm is pivoted up;
   e. a resilient coil spring comprising first and second ends, said first end of said spring in contact with said frame and said second end of said spring in contact with said second end of said throw arm effective to force said first end of said throw arm to swing up in a direction away from said frame;
   f. a catch effective for releasably retaining said throw arm in said first position when said arm is in said first position and said pan is in said cocked position, and releasing said throw arm to swing up to said second position when said pan is pivoted down to said release position;
   g. an open ended horseshoe member attached to and extending from said first end of said throw arm, said horseshoe member comprising a pair of opposed side arms extending outwardly away from said throw arm and opposed first and second flanges projecting inwardly from said side arms, wherein said opposed side arms at least partially circumscribe said bail and said opposed first and second flanges extend inwardly below said bail when said bail and throw arm are both positioned substantially parallel to said frame.

2. The apparatus of claim 1 wherein said catch is attached to and extends from one of said first end of said throw arm or said pan a sufficient length to engage the other of said of said first end of said throw arm or said pan and releasably retain said throw arm in said first position when said arm is in said first position and said pan is in said cocked position, and further wherein said catch is disengaged when said pan is pivoted down to said release position allowing said throw arm to swing up to said second position.

3. The apparatus of claim 2 wherein said catch is attached to and extends from said first end of said throw arm and engages said pan.

4. The apparatus of claim 2 wherein said catch comprises a flange with a detent thereon thereof which frictionally engages an edge of the pan.

5. The apparatus of claim 2 wherein said catch comprises a hook or pawl.

6. The apparatus of claim 2 wherein said catch is adjustable to selectively change the relative distance between it and said pan or said throw arm which it engages.

7. The apparatus of claim 1 wherein said trigger is adjustable to selectively change the relative distance between it and said catch.

8. The apparatus of claim 1 wherein said pan comprises a flange extending therefrom toward said throw arm, said catch engages said pan at said flange.

9. The apparatus of claim 1 wherein said bail comprises an end extending away from said first end of said frame which comprises a substantially triangular projection.

10. The apparatus of claim 1 wherein said horseshoe comprises one or more clips effective for releasably retaining a snare therein.

11. The apparatus of claim 10 wherein said clips are disposed on at least one of said opposed side arms.

12. The apparatus of claim 1 wherein said apparatus further comprises an adjustable set screw extending upwardly from said frame in contact with the lower surface of said throw arm, and said set screw is movable in a direction away from and toward said lower surface of said throw arm.

13. The apparatus of claim 1 wherein said apparatus further comprises a snare comprising a cable having first and second ends with a slidable loop on said first end, said snare being disposed on said apparatus with said loop encircling said pan and partially under said bail, and said second end of said snare extending over one or both of said horseshoe and said throw arm.

14. The apparatus of claim 1 wherein said resilient coil spring comprises an outwardly extending end adjacent to said second end of said throw arm, and said throw arm further comprises a slidably mounted sleeve movable to a position over said outwardly extending end of said spring, releasably retaining said outwardly extending end of said spring adjacent to the shaft of the throw arm.

15. An apparatus for capturing animals in a snare comprising:
   a. a frame having first and second ends adapted to be placed on or in the ground;
   b. a trigger pivotally attached to said frame adjacent said first end thereof, said trigger comprising a pan movable between a cocked position substantially parallel to said frame, and a release position wherein said pan is pivoted down in response to pressure applied from a target animal;
   c. a throw arm comprising first and second ends, said second end of said throw arm being pivotally attached to said frame and movable between a first position substantially parallel to said frame, and a second position wherein said arm is pivoted up;
   d. a resilient coil spring comprising first and second ends, said first end of said spring in contact with said frame and said second end of said spring in contact with said second end of said throw arm effective to force said first end of said throw arm to swing up in a direction away from said frame;
   e. a catch effective for releasably retaining said throw arm in said first position when said arm is in said first position and said pan is in said cocked position, and releasing said throw arm to swing up to said second position when said pan is pivoted down to said release position;
   f. an open ended horseshoe member attached to and extending from said first end of said throw arm, said horseshoe member comprising a pair of opposed side arms extending outwardly away from said throw arm and one or more clips effective for releasably retaining a snare therein.

16. The apparatus of claim 15 wherein said clips are disposed on at least one of said opposed side arms.

17. The apparatus of claim 15 wherein said catch is attached to and extends from one of said first end of said throw arm or said pan a sufficient length to engage the other of said of said first end of said throw arm or said pan and releasably retain said throw arm in said first position when said arm is in said first position and said pan is in said cocked position, and further wherein said catch is disengaged when said pan is pivoted down to said release position allowing said throw arm to swing up to said second position.

18. The apparatus of claim 17 wherein said catch is attached to and extends from said first end of said throw arm and engages said pan.

19. The apparatus of claim 17 wherein said catch comprises a flange with a detent thereon thereof which frictionally engages an edge of the pan.

20. The apparatus of claim 17 wherein said catch comprises a hook or pawl.

21. The apparatus of claim 17 wherein said catch is adjustable to selectively change the relative distance between it and said pan or said throw arm which it engages.

22. The apparatus of claim 15 wherein said pan comprises a flange extending therefrom toward said throw arm, said catch engages said pan at said flange.

23. The apparatus of claim 15 wherein said apparatus further comprises an adjustable set screw extending upwardly from said frame in contact with the lower surface of said throw arm, and said set screw is movable in a direction away from and toward said lower surface of said throw arm.

24. The apparatus of claim 15 wherein said apparatus further comprises a snare comprising a cable having first and second ends with a slidable loop on said first end, said snare being disposed on said apparatus with said loop encircling said pan and within said clips, and said second end of said snare extending under said horseshoe and over said throw arm.

25. The apparatus of claim 15 wherein said resilient coil spring comprises an outwardly extending end adjacent to said second end of said throw arm, and said throw arm further comprises a slidably mounted sleeve movable to a position over said outwardly extending end of said spring, releasably retaining said outwardly extending end of said spring adjacent to the shaft of the throw arm.

26. A method for capturing an animal in a snare comprising:
   a. providing the apparatus of claim 1 on or in the ground in the locus or vicinity of a target animal;
   b. setting said apparatus comprising placing said throw arm and said bail substantially parallel to said frame with said first and second flanges below said bail, placing said pan in said cocked position engaged by said catch;
   c. providing a snare comprising first and second ends with a slidable loop on said first end, and positioning said snare on said apparatus with said loop encircling said pan and partially under said bail, and said second end of said snare extending under said horseshoe and over said throw arm and affixed to the ground;
wherein said apparatus is activated to catch a target animal when said animal steps on said pan, thereby disengaging said catch from said pan and swinging said throw arm up under the force of said resilient spring and pulling said loop of the snare tight against the foot or leg of said animal.

27. A method for capturing an animal in a snare comprising:
   a. providing the apparatus of claim 15 on or in the ground in the locus or vicinity of a target animal;
   b. setting said apparatus comprising placing said throw arm substantially parallel to said frame and placing said pan in said cocked position engaged by said catch;
   c. providing a snare comprising first and second ends with a slidable loop on said first end, and positioning said snare on said apparatus with said loop encircling said pan and within said clips, and said second end of said snare extending under said horseshoe and over said throw arm and affixed to the ground;
wherein said apparatus is activated to catch a target animal when said animal steps on said pan, thereby disengaging said catch from said pan and swinging said throw arm up under the force of said resilient spring and pulling said loop of the snare tight against the foot or leg of said animal.

* * * * *